L. E. HIRT.
MANUFACTURE OF CARBON OR LAMP BLACK.
APPLICATION FILED JULY 21, 1915.
1,264,796.
Patented Apr. 30, 1918.
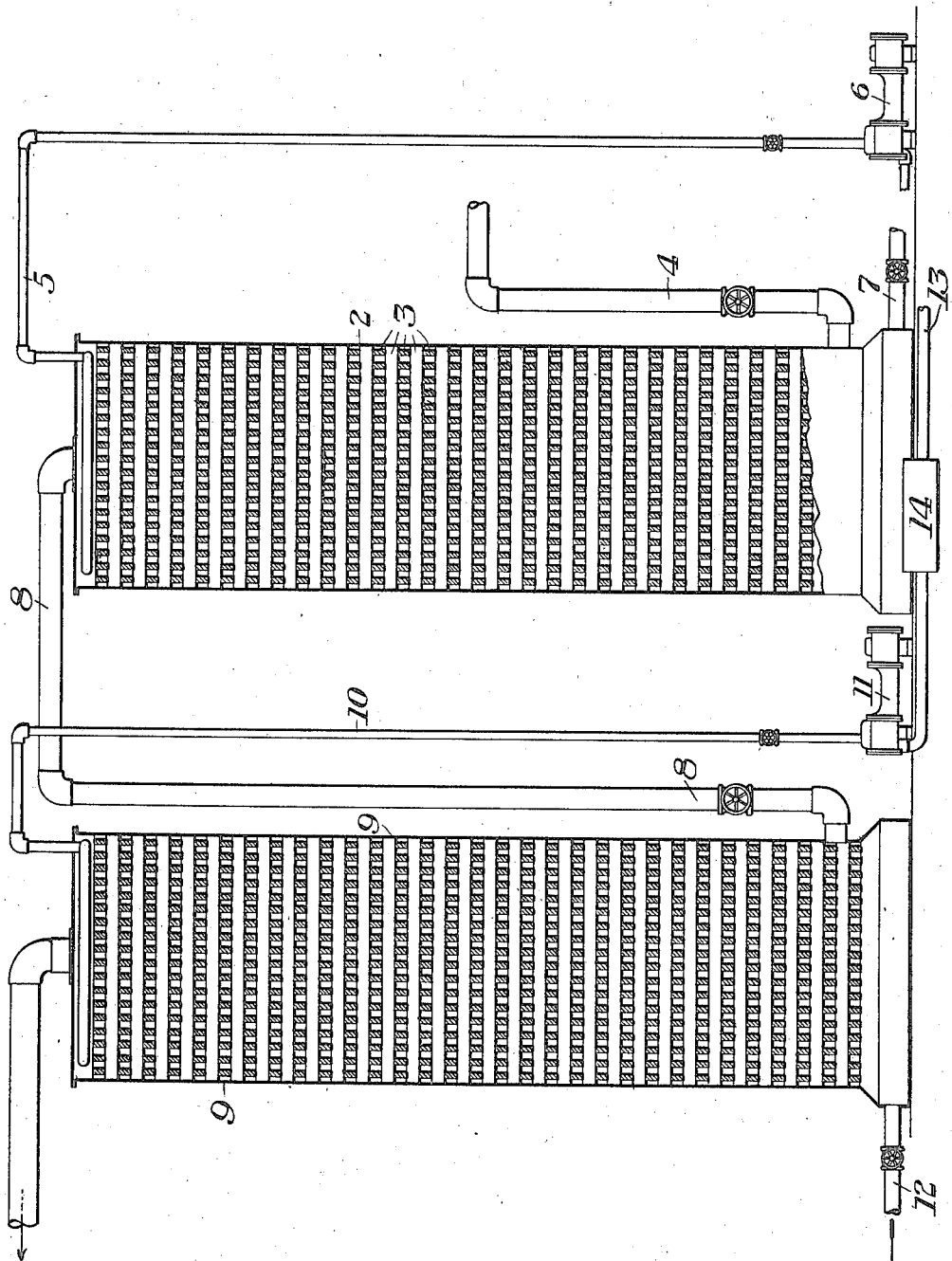
WITNESSES
INVENTOR
L. E. Hirt

UNITED STATES PATENT OFFICE.

LEON E. HIRT, OF CHARLESTON, WEST VIRGINIA.

MANUFACTURE OF CARBON OR LAMPBLACK.

1,264,796.  Specification of Letters Patent.  Patented Apr. 30, 1918.

Application filed July 21, 1915.  Serial No. 41,108.

*To all whom it may concern:*

Be it known that I, LEON E. HIRT, a citizen of the United States, residing at Charleston, in the county of Kanawha and State of West Virginia, have invented a new and useful Improvement in the Manufacture of Carbon or Lampblack, of which the following is a full, clear, and exact description, reference being had to the accompanying drawing, forming part of this specification, in which—

The figure is a view, largely conventional and partly in vertical section, and partly in side elevation, showing one form of apparatus which may be used for carrying out my invention.

My invention has relation to the manufacture of carbon or lamp black from natural gas. Natural gas, as it is received from gas wells, or from gas and oil wells, is highly variable in the hydrocarbon constituents with which it is saturated. For instance, gas from wells which also give oil has a greater percentage of heavy hydrocarbons than gas from wells giving gas only. In the manufacture of carbon black from natural gas, the percentage of hydrocarbons present in the gas varies the grade, quality, quantity, and other commercial characteristics which go to determine the market value of the product; and in the methods heretofore in use the matter of handling a carbon black plant using natural gas so as to produce the various forms of commercial carbon black as used in paint, ink and other industries, has been a difficult one. The equipment required in such a plant is extensive and occupies considerable acreage, and it is not an easy matter to continually change the handling of the carbon houses to suit the variations in the gas supply.

It is therefore highly desirable to provide some method by which the gas supplied to the burners can be controlled in such a way as to maintain a uniform saturated condition thereof, and in this manner cause the resultant product to be accurately maintained at such a grade and quality as may be desired. My invention is designed to provide a method which will accomplish this object in a very efficient and satisfactory manner.

My invention is based upon the fact that natural gas can hold in solution or suspension certain percentages of heavier hydrocarbons, such as oil vapor; and that the amount of oil vapor so held will depend upon (1st) the relative temperatures of the oil and gas; (2nd) the method employed to bring the oil and gas in contact with each other; and (3rd) the nature of the oil used in treating the gas. Too much oil can be carried suspended in a purely mechanical way. In making carbon black, the gas is burned in fish-tail tips, and too much oil carried in suspension results in clogging of the tips, the spoiling of the manufactured carbon, and other mechanical plant troubles.

Many tests and experiments have been made prior to my invention in an attempt to obviate these difficulties, but have proven failures, owing to the fact that the gas and oil were not properly handled and their relative temperatures properly controlled. The present invention has been operated on a commercial scale, gas having been treated to the extent of from two and one-half to three million cubic feet per day; and it has been found that the yield of carbon black was not only substantially uniform and of the desired quality and characteristics; but that the yield was also greater in proportion to the amount of gas consumed. This tends to show that there is apparently some action of the oil as a catalytic agent. It is a well known economic fact that the method of burning natural gas into carbon black is extremely low in efficiency, and hence the importance of any method which will increase the production per unit of gas consumed.

In carrying out my invention, I first preferably pass the natural gas as it comes from the well or mains through a scrubber for the purpose of removing the gasolene vapors contained in the gas. The medium employed for removing these vapors is an oil of from 32 degrees Bé. to 38 degrees Bé. This oil is relatively colder than the gas, and the gasolene vapors have a stronger affinity for this cold oil than for the natural gas. I have obtained good results by using the oil at a temperature of from 64 degrees F. to 72 degrees F., and keeping the gas at least 10 degrees higher in temperature than the oil. The gas is then passed through a saturater in which the liquor used may be oil of similar physical properties to those used in the scrubber. In the saturater the temperature of the oil should be preferably above that of the gas, although this is not necessarily the case. I have employed gas from gas heaters at a temperature of from 90 to 100 degrees F., and with the oil at a temperature of 70 degrees F. with good results. Better results have, however, been obtained with the gas at a temperature of from 75 to 85 degrees F. and the oil at a temperature of from 120 to 140 degrees F. The product obtained is better when the temperature of the oil exceeds that of the gas by at least 10 degrees F.

The rate of association of the gas and oil in the saturater in the saturating step is a factor essential to the saturating operation.

In the accompanying drawing I have shown one form of apparatus which may be employed. In this drawing the numeral 2 designates the scrubbing apparatus, shown as consisting of a cylindrical shell, say of a diameter of eight feet and of a height of from twenty-five to thirty feet, fitted internally with superimposed layers 3 of slatting placed on edge, each layer being laid about 90 degrees from the adjacent layer. The gas enters the bottom of the scrubber from the supply pipe 4, while the relatively cold oil enters at the top from the pipe 5 supplied by the pump 6. The gas in passing upwardly through the layers of slatting meets the cold oil which trickles down through the slatting. The height of the tower and the volume of gas passed through it per unit of time will be determined by the grade of carbon which it is desired to produce.

The condensed gasolene vapors may be taken out through the connection 7.

The gas, freed of the gasolene vapors, passes out from the top of the scrubber through the pipe 8 and enters the lower part of the saturater 9 which is shown as being similar in construction to the scrubber. Hot oil is supplied to the top of the saturater by the pipe 10 connected with the pump 11. 12 is an offtake connection at the bottom for the oil, which may be returned to the pump 11 through the pipe 13 (partly broken away). A temperature regulator 14 of any known character may be interposed in the pipe 13 so as to accurately control the temperature of the oil, which can thus be continuously circulated in the system. In passing through the saturater the gas flowing upwardly, comes in contact with the hot oil trickling down, and the gas in this manner becomes uniformly saturated, the volume of flow through the saturater being controlled. The oil used in the scrubber is preferably circulated through water coolers (not shown) before passing to the pump 6, so that its temperature may be controlled.

I may, however, return the hot oil from the saturater through a cooler to the pump 6, thence through the scrubber, thence to the temperature regulator 14 where it is heated, and thence into the saturater 9.

A considerable degree of variation in the desired product can be obtained by proper control of the relative temperatures of the oil and gas and the rate at which the two are brought into contact with each other in the saturater. At the same time, however, the temperatures cover a considerable range, so that extreme delicacy of adjustment is not required.

Various forms of scrubbing and saturating apparatus may be employed. Thus, the scrubbing apparatus can be of any usual type used in the gas work industry, and including the rotary machines, the usual bell type washers, etc. The particular construction of the saturaters employed may also be widely changed.

In some cases the scrubbing step may be omitted, although I consider it preferable to remove the heavier condensible vapors from the gas before passing it into the saturater.

My invention provides a method of utilizing natural gas in the manufacture of carbon black in which the characteristics of the product as to quality, color, texture, and other commercial requisites can be very accurately controlled, and a uniform product of the desired characteristics produced. This can be accomplished with an increased yield of product per unit volume of gas consumed and at a considerable reduction in the operating cost by reason of the doing away with the time and cumbersome methods of variation in plant handling which has heretofore been required. As above indicated, the results of commercial tests of the invention seem to indicate that the oil vapor in the gas has some catalytic effect which causes greater deposition of carbon on the depositors at the carbon houses.

I claim:

1. The process of making carbon black from natural gas, which consists in reducing the oil vapor content of the gas below a predetermined minimum amount, in thereafter restoring a regulated quantity of oil vapor to the gas and thereby giving it a predetermined and uniform oil vapor content, and in burning the gas so as to deposit carbon black, the character of the carbon black being predetermined by the oil vapor content of the burned gas, substantially as described.

2. The process of making carbon black from natural gas, which consists in removing oil vapors from the gas and in restoring to the gas a regulated quantity of oil vapor in excess of that removed and thereby giving it a predetermined and uniform oil vapor content, and in burning the gas so as to deposit carbon black, the character of the carbon black being predetermined by the oil vapor content of the burned gas, substantially as described.

3. The process of making carbon black from natural gas, which consists in intimately mixing the gas with a cold oil and thereby reducing the oil vapor content of the gas below a predetermined amount, and thereafter intimately mixing the gas with an oil at a predetermined temperature higher than that of the first oil to restore oil vapor to the gas and give the gas a predetermined uniform oil vapor content, and in burning the gas so as to deposit carbon black, the character of the carbon black being predetermined by the oil vapor content of the burned gas, substantially as described.

4. The process of making carbon black from natural gas, which consists in intimately mixing the gas with an oil to remove condensable oil vapors therefrom, and in thereafter intimately mixing the gas with oil at a higher temperature to restore thereto oil vapor in excess of that removed, and in burning the gas so as to deposit carbon black, the character of the carbon black being predetermined by the oil vapor content of the burned gas, substantially as described.

5. The process of making carbon black from natural gas, which consists in intimately mixing the gas with an oil to remove condensable oil vapors therefrom, and thereafter intimately mixing the gas with oil at a high temperature to restore thereto oil vapor in excess of that removed and regulating the temperature at which the oil and gas are mixed to control and predetermine the oil vapor content of the gas, and in burning the gas so as to deposit carbon black, the character of the carbon black being predetermined by the oil vapor content of the burned gas.

6. The process of making carbon black from natural gas, which consists in intimately mixing the gas with an oil, in regulating the temperature at which the oil and gas are mixed to control and predetermine the oil vapor content of the gas, and in burning the gas so as to deposit carbon black, the character of the carbon black being predetermined by the oil vapor content of the burned gas.

7. The process of making carbon black from natural gas, which consists in intimately mixing the gas with an oil at a temperature not less than 60° F. or more than 150° F., in regulating the temperature of the oil to control and predetermine the oil vapor content of the gas, and in burning the gas so as to deposit carbon black, the character of the carbon black being predetermined by the oil vapor content of the burned gas.

8. The process of making carbon black from natural gas, which consists in intimately mixing the gas with a liquid oil, in regulating the temperature at which the oil and gas are mixed to control and predetermine the oil vapor content of the gas, and in burning the gas so as to deposit carbon black, the character of the carbon black being predetermined by the oil vapor content of the burned gas.

9. The process of making carbon black from natural gas, which consists in intimately mixing the gas with a cold oil and thereby reducing the oil vapor content of the gas below a predetermined amount, in heating the oil and thereafter intimately remixing the oil and gas to restore to the gas oil vapor in excess of that removed by the cold oil, in regulating the temperature of the heated oil to control and predetermine the amount of oil vapor restored to the gas, and in burning the gas so as to deposit carbon black, the character of the carbon black being predetermined by the oil vapor content of the burned gas.

10. The process of making carbon black from natural gas, which consists in intimately mixing the gas with a cold oil to remove oil vapor therefrom, in heating the oil and intimately remixing the oil and gas to restore oil vapor to the gas in excess of that removed, in regulating the temperature at which the heated oil and gas are mixed to control and predetermine the oil vapor content of the gas, in cooling the oil and repeating the steps of mixing and remixing with a fresh supply of gas, and in burning the gas so as to deposit carbon black, the character of the carbon black being determined by the oil vapor content of the burned gas.

11. In the process of making carbon black from natural gas, the steps of reducing the oil vapor content of the gas by intimately mixing the gas with a cold oil, and of burning the gas so as to deposit carbon black, substantially as described.

In testimony whereof, I have hereunto set my hand.

LEON E. HIRT.

Witnesses:
B. D. TRUSLOW,
HENRY S. COHEN.